United States Patent [19]

Casey

[11] Patent Number: 4,761,295

[45] Date of Patent: Aug. 2, 1988

[54] TECHNIQUE FOR USING REVERSE OSMOSIS UNIT

[75] Inventor: John P. Casey, Nueces County, Tex.

[73] Assignee: Williams Wholesalers, Inc., Corpus Christi, Tex.

[21] Appl. No.: 867,383

[22] Filed: May 27, 1986

[51] Int. Cl.⁴ .......................... A21D 2/02; A23L 2/00
[52] U.S. Cl. .................... 426/549; 99/323.2; 210/652; 210/663; 210/257.2; 210/266; 222/129.4; 222/189; 426/590; 426/477
[58] Field of Search ............ 210/652, 251, 257.2, 210/90, 266, 663; 426/62, 67, 330.3, 416, 477, 523, 590, 549, 658; 99/323.2, 484; 222/129.4, 189

[56] References Cited

U.S. PATENT DOCUMENTS 3,943,261  3/1976  Amon et al. .................. 210/756
4,160,727  7/1979  Harris ........................... 210/639
4,176,063  11/1979 Tyler ............................ 210/257.2

OTHER PUBLICATIONS

Whitlock, Sandra, "Concern for Water Quality Spawns New Technologies", Beverage Industry, Dec. 1985, pp. 14–15.

"Beverage Dispensing Equipment", McCann's Engineering & Mfg. Co. sales brochure.

"Ultrafiltration and Reverse Osmosis Systems", Osmonics, Inc.

Primary Examiner—Ivars Cintins
Attorney, Agent, or Firm—G. Turner Moller

[57] ABSTRACT

A post-mix soft drink dispenser includes, in the feed water supply, a reverse osmosis unit for treating the inlet water and a carbonator for adding carbon dioxide to the treated water. The use of RO water provides a better tasting soft drink, allows the use of substantially less soft drink syrup or a combination thereof. An ingredient water tap downstream of the reverse osmosis unit allows the use of RO water in recipes, particularly for baked products, providing surprising results.

9 Claims, 2 Drawing Sheets

TECHNIQUE FOR USING REVERSE OSMOSIS UNIT

This invention relates to a technique for using a reverse osmosis unit and more particularly to placing a reverse osmosis water purification unit in the water supply of a post-mix soft drink dispenser.

Reverse osmosis water purification units are well known in the prior art for removing dissolved solids from water or other liquids. Such units have a semipermeable membrane providing passages therethrough which are so small that water will pass through them but normal dissolved solids will not. Present commercially available membranes are made of either cellulose acetate or a thin film composite having passages of 5–20 Angstroms in diameter. Typically, feed water is pumped into the inlet of the reverse osmosis unit. The pump pressure forces water molecules through passages of the membrane and leaves the dissolved solids behind. Thus, there is created a stream of water, called the permeate, having relatively little dissolved solids therein and a stream of water, called the concentrate, having a relatively large quantity of dissolved solids therein. The amount of dissolved solids left in the permeate depends on a number of factors, such as the total dissolved solids in the feed water, the original design of the membrane, the age and state of deterioration of the membrane, the pump pressure and the like.

Reverse osmosis units have been widely used to provide exceptionally high quality water for a variety of purposes. Almost all RO units are large, high capacity devices for use in industrial or high volume commercial applications. Typical installations are for salt separation in mineral recovery situations, boiler feed water purification, pretreatment for de-ionizers, separation of plating salts in electrochemical plating operations, reclamation of rinse water and water reuse, reclamation of valuable metals from plating and photography, upgrading waste water to meet legal regulatory requirements, removing radioactive elements and pesticides from waste water, enriching protein in a solution, concentrating whey, maple syrup, orange juice, apple juice, beer, wine, coffee and milk and the like.

Recently, small volume reverse osmosis units have been proposed and constructed for purifying home drinking water, purifying water for dispensing from a coin operated dispenser, purifying water for green house spraying, for supplying water to ice machines and the like.

It is known in the prior art to purify the feed water in a commercial soft drink bottling operation. Usually, water from a city main is the feed water. Hydrated lime, chlorine and ferric sulfate are added to the city water. The hydrated lime causes calcium and magnesium carbonates and sulphates to settle out in a downstream tank. Even though the city water is already chlorinated, additional chlorine is added to precipitate some iron compounds as ferric or ferrous chloride and to be certain that no bacteria will flourish in the bottled soft drink. It will be appreciated that sugared soft drink is an excellent culture for bacteria. The ferric sulphate is a clarifier which attracts small suspended particles and which settles out in the large downstream tank. This tank typically has a residence time of at least two hours to allow the various separation processes to occur. See Beverage Industry, December 1985, "Concern for water quality spawns new technologies." It has been suggested to use reverse osmosis units as water purifiers in commercial soft drink bottling operations. See Beverage Industry, supra, and Osmonics, Inc., Minnetonka, Minn. brochure entitled "Ultra-filtration and Reverse Osmosis Systems." The purified water is then mixed with soft drink syrup and carbon dioxide and is then bottled to produce conventional bottled soft drinks.

The amount of syrup that is added to the water depends on two things: (1) what the taster wants the soft drink to taste like; and (2) the nature of the water that is mixed with the syrup. There is a wide variation in quality of city water throughout the United States. Thus, it is a tribute to those in the soft drink industry that commercially bottled national brands taste pretty much the same from locale to locale.

The situation regarding post-mix soft drink dispensers is quite different. Rather than dispense soft drinks which are already mixed, most food operations use a post-mix soft drink dispenser to mix, carbonate and dispense soft drinks from syrup on the spot. As compared to pre-mix dispensers which merely dispense pre-mixed product, post-mix dispensers provide a much greater margin or profit to the restaurant or fast food operator while requiring less space and less employee attention. It is accordingly no surprise that post-mix dispensers have come to dominate this segment of the soft drink market. An unintended side effect of the development of post-mix dispensers is that post-mix soft drinks do not always taste the same from locale to locale. Indeed, it is the rule rather than the exception that post-mix soft drinks taste different from area to area and even from one location to the next in the same area. In retrospect, the reasons are easy to see: (1) the quality of city waters vary substantially and (2) a large number of people control the ratio between syrup and water.

Of some interest with respect to this invention are the disclosures in U.S. Pat. Nos. 3,943,261 and 4,160,727.

This invention comprises a low volume reverse osmosis unit in the feed water supply of a post-mix soft drink dispenser, preferably upstream from the carbonator thereof. The permeate, or low dissolved solids water stream, is delivered to the carbonator while the concentrate, or the high dissolved solids water stream, is discarded through a flow line to a sewer or waste water connection. Thus, the water delivered to the carbonator and post-mix dispenser contains much less dissolved solids than does the feed water. The first and immediate effect is to change the taste of the soft drink dispensed from the post-mix dispenser. Universally, soft drinks made with RO water taste stronger, sweeter and more "syrupy." Thus, the operator has several options: (1) the ratio of syrup to water can be retained to provide the stronger or better tasting drink; (2) the amount of syrup can be reduced substantially to provide the "old" taste; or (3) more commonly, the amount of syrup can be reduced somewhat to provide a better tasting soft drink which costs less to the operator.

One of the features of this invention is to provide an ingredient water tap downstream of the reverse osmosis unit and upstream of the carbonator. Water from this tap can be used as an ingredient in various recipes of the food operation. It has been discovered that the use of RO water in bakery operations provides significantly different rolls, breads and the like when compared to the identical recipe using conventional city water. It is surmised, but not know definitively, that purer water allows yeast to grow more rapidly and thus produce fluffier dough in the prescribed recipe time.

Another ancillary feature of this invention is that the ice machine of a restaurant or fast food operation is connected to the outlet of the reverse osmosis unit. Ice made from RO water is about as clear as ordinary window glass. More importantly, the frequency of maintenance or repair calls on ice machines using RO water is much lower than on ice machines using normal city water.

It is an object of this invention to provide a post-mix soft drink dispensing unit having a reverse osmosis water treatment unit upstream thereof.

Another object of this invention is to provide a reverse osmosis unit upstream from a carbonator in a post-mix soft drink dispensing unit.

A further object of this invention is to provide a reverse osmosis unit upstream from a post-mix soft drink dispensing unit including an ingredient water tap between the RO unit and the dispenser.

IN THE DRAWINGS

Figure 1:
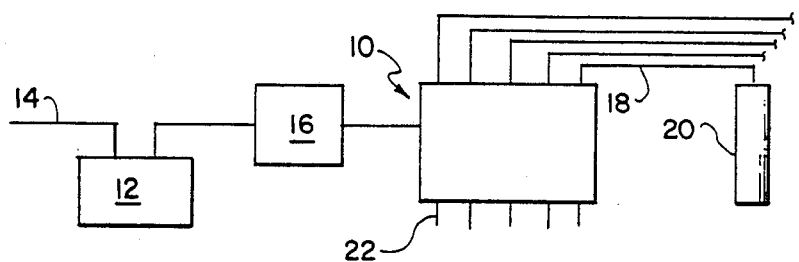
FIG. 1 is a schematic view of a conventional post-mix soft drink dispenser of the type used in a fast food operation.

Referring to FIG. 1, a standard post-mix soft drink dispenser 10 typically, but not necessarily, includes a filter 12 in the water supply line 14 upstream of the dispenser 10. The purpose of the filter 12 is to remove any large sized trash in the city water and prevent it from contaminating the soft drink product delivered by the dispenser 10. Also upstream from the dispenser 10 is a carbonator 16 that adds carbon dioxide in proper proportion to the feed water in the line 14. The dispenser 10 mixes the correct proportion of carbonated water from the supply line 14 with syrup from one of a multiplicity of lines 18 leading to a like multiplicity of tanks or containers 20 in order to dispense a variety of mixed products through an outlet valve-nozzle arrangement 22 in response to manipulation of a trigger (not shown).

A wide variety of post-mix dispensers are presently commercially available. One type is as illustrated in FIG. 1 comprising a multiplicity of separate outlet valves 22 which deliver different product through separate outlet nozzles. Another type is hand held and includes a single outlet nozzle and a multiplicity of outlet valves. A third type includes a single outlet and a single valve for a single product. It will suffice for present purposes to state that the present invention contemplates the use of a reverse osmosis unit in the water supply upstream from a carbonator and post-mix dispenser of any suitable type. In the event there is any question about the post-mix dispensers described herein, reference is made to the publications of McCann's Engineering & Mfg. Co., Los Angeles, Calif., which are incorporated herein by reference.

Figure 2:
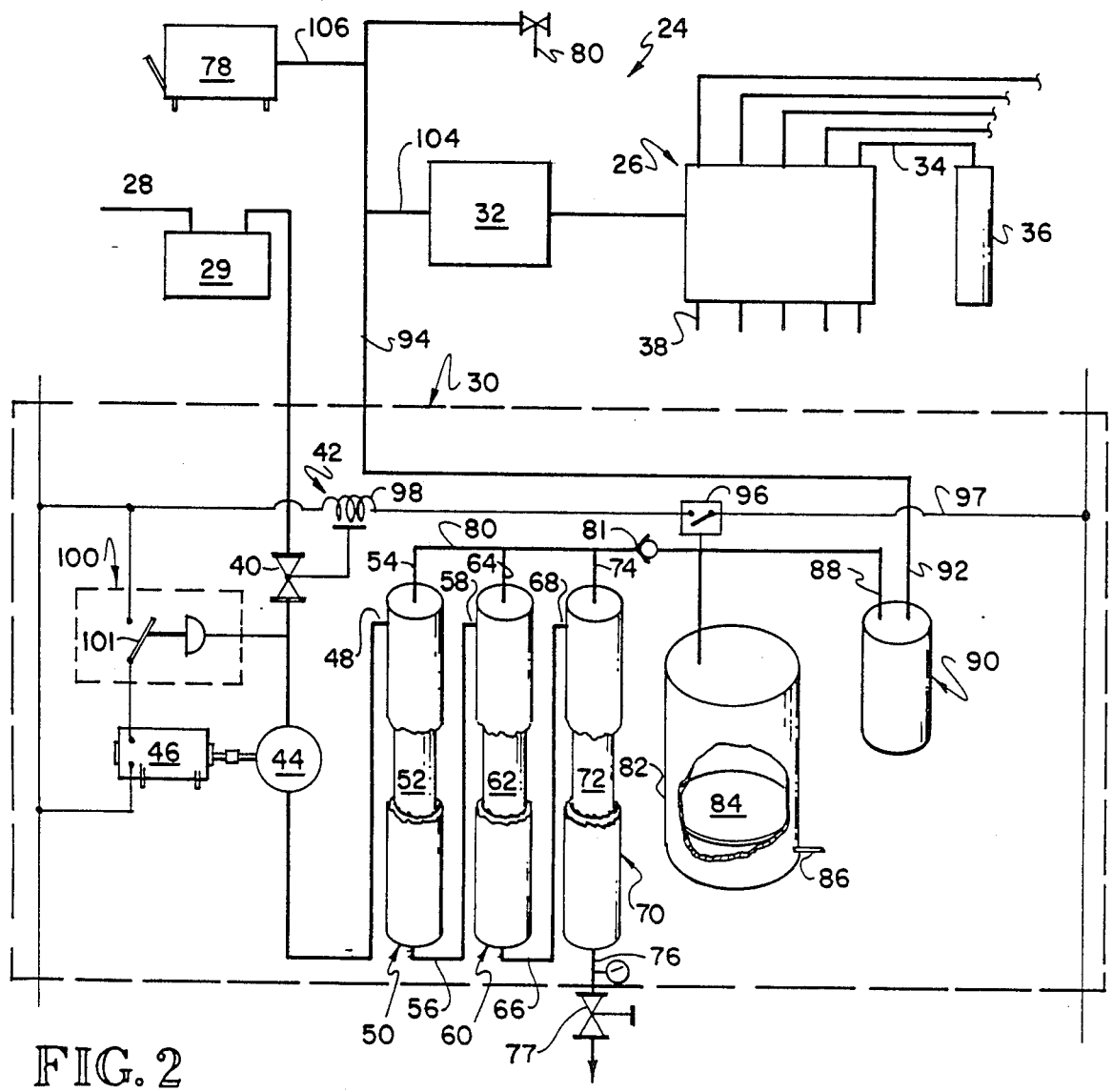
FIG. 2 is a partially schematic view of the post-mix soft drink dispensing system of this invention incorporating a reverse osmosis unit.

Referring to FIG. 2, there is illustrated a system 24 of this invention comprising a conventional post-mix dispenser 26 receiving feed water from a water supply 28 in which is located a pre-filter 29 for removing large trash from the normal or city water supply. A reverse osmosis unit 30 receives filtered water from the prefilter 29 and delivers RO water to a carbonator 32. The carbonator 32 mixes carbon dioxide with water from the RO unit 30 and delivers it to the post-mix dispenser 26.

The post-mix dispenser 26 includes a multiplicity of lines 34 leading to a like multiplicity of syrup tanks or containers 36. When one of the triggers (not shown) of the dispenser 26 is activated, syrup from the selected tank 36 passes through the line 34 into the dispenser 26 where it is mixed with a predetermined ratio of carbonated water and delivered out of the outlet valve-nozzle arrangements 38 associated with the manipulated trigger.

The reverse osmosis or RO unit 30 is of more-or-less conventional design and includes a valve 40, manipulated by a solenoid operator 42, upstream from a feed water pump 44 driven by a suitable electric motor 46. The outlet of the pump 44 is connected to the inlet 48 of a pressure vessel 50 having therein a standard spiral wound RO membrane module 52. Although many different types of membrane modules are acceptable, a preferred type is available from Desalination, Inc. as Model C19H. These type pressure vessels and membrane modules are the standard of the RO industry and will be well understood by those skilled in the art. In the event more explanation is required, reference is made to a brochure of Osmonics, Inc. of Minnetonka, Minn. entitled Ultrafiltration and Reverse Osmosis Systems.

RO water from the membrane module 52 passes out of the pressure vessel 50 through a permeate outlet 54 while the concentrate from the module 52 passes out of the pressure vessel 50 through a concentrate outlet 56. The concentrate outlet 56 of the first pressure vessel 50 is connected to the feed water inlet 58 of a second pressure vessel 60 having a standard spiral wound membrane module 62 therein. RO water from the second membrane module 62 passes out of the pressure vessel 60 through a permeate outlet 64 while the concentrate from the module 62 passes out of the pressure vessel 60 through a concentrate outlet 66. The number of pressure vessel-membrane module assemblies used in a particular application is a function of the designed RO water output and the desired or selected ratio of permeate to feed water. The ratio of permeate to feed water is called yield or recovery and can be controlled to some extent by varying the pressure applied by the pump 44 and the number of membrane modules placed in series. As a general rule, the more membrane modules placed in series, the larger the yield of the system, with a limit of about six modules in series. It is preferred to operate the RO unit 30 so that the yield of the unit 30 is in the range of 20-30%. This selection is a trade off between discarding a relatively large quantity of waste water and providing a system which is not subject to numerous maintenance calls because of solids precipitation in the last membrane module. Because the unit 30 is of relatively low volume through-put, even a relatively large proportion of waste water is not significant. Thus, the decision to limit yield to 20-30% is easy.

In the illustrated RO unit 30, the concentrate outlet 66 of the second pressure vessel 60 is illustrated as connected to the feed water inlet 68 of a third pressure vessel 70 having a standard spiral wound membrane module 72 therein. RO water from the module 72 exits through a permeate outlet 74 while concentrate from the vessel 70 exits through a concentrate outlet 76 having a throttling valve 77 therein for controlling pressure in the system. The concentrate outlet 76 delivers waste water from the RO unit and is accordingly connected to a sewer line or waste water disposal connection.

Typically, the RO units 30 of this invention are relatively small, usually having capacities of 300–600 gallons per day. This, is, of course, a function of the maximum daily amount of water used in the post-mix dispenser 26 plus the maximum daily amount of water used by an ice machine 78 and ingredient water tap 79, as discussed more fully hereinafter, plus a healthy safety factor to allow for business growth, system deterioration and the like. Thus, with yields in the range of 20–30%, it will be seen that the total quantity of waste water will vary from 1000–3000 gallons daily. Under conditions existing in most places, this is not a significant matter. In the event this much waste water were to become onerous, there are many uses for the waste water from the outlet 76 in a normal restaurant or fast food operation, such as rest rooms or the like. It might be thought that the concentrate is very undesirable water. This is not the case. Assuming that the feed water contains 500 ppm dissolved solids and recovery is 20–30%, the concentrate from the outlet 76 will have only 600–750 ppm dissolved solids.

The permeate outlets 54, 64, 74 connect to a common collection line 80 having a check valve 81 therein to prevent permeate from backflowing into the vessels 50, 60, 70. The collection line 80 leads to an accumulator vessel 82. The vessel 82 preferably includes a bladder 84 therein pressurized through a fitting 86 on the lower side thereof for maintaining pressure on the RO water in the vessel 82. The collection line 80 leads to an inlet 88 of an activated carbon filter arrangement 90 having an outlet 92 connected to an RO water distribution line 94. The activated carbon filter 90 may be of any suitable type, such as is available from Ametek, Inc. as Model C1. At first blush, it seems ludicrous to use a filter downstream of the membrane modules 52, 62, 72 because the passages therethrough are in the range of 5–20 Angstroms—very small compared to the filtering passages of any ordinary mechanical filter. The purpose of the carbon filter arrangement 90 is not to remove any particles from the permeate but is instead to remove many dissolved gases in the permeate which are troublesome, such as chlorine, hydrogen sulphide, or even aromatic hydrocarbons from the pressure tank 82 or the like. Such dissolved gases may have passed through the membrane modules 52, 62, 72 or may have been picked up in the RO unit 30. Typically, chlorinated city water has 1–5 ppm dissolved chlorine. Something in the range of 30–70% of this chlorine is discharged with the waste water leaving something on the order of 0.3–3 ppm chlorine behind in the permeate. The carbon filter arrangement 90 removes most of this dissolved chlorine because it is adsorbed on the surface of the activated carbon media. The filter arrangement 90 is located downstream of the tank 82 to allow any chlorine in the water stored therein to suppress bacterial growth in the tank 82. Manifestly, the residence time of RO water in the lines downstream of the filter arrangement 90 is very short which does not give bacteria time to propagate to significant numbers.

A pressure sensitive switch 96 is in communication with the collection line 80 and thus in communication with the storage tank 82. When the pressure in the line 80 is below a predetermined value, the switch 96 is closed thereby providing electrical power in a wire 97. The solenoid operator 72 includes a coil 98 in the wire 97 in series with the switch 96, which is the main power switch. In the event little or no water is being delivered through the inlet line 28, pressure at the pump suction falls to a predetermined value sensed by a low pressure cutoff switch 100 which opens a contact 101 thereby disabling the pump motor 46 and preventing damage thereto. When demand for RO water falls off, pressure in the storage tank 82 rises to a predetermined value which is sensed by the pressure switch 96 which thereupon opens to deenergize the solenoid 98 and close the valve 40 and interrupts power to the motor 46.

The water distribution line 94 connects to the inlet 104 of the carbonator 32, to an inlet 106 of the ice maker 78 and to the ingredient water spigot 80 as previously mentioned. The use of RO water from the ingredient spigot 80 provides unusual effects in a restaurant or fast food setting. Reconstituted fruit juices, tea, and coffee taste significantly better. As mentioned previously, rolls baked with RO water rather than city water provided substantially fluffier products.

Figure 3:
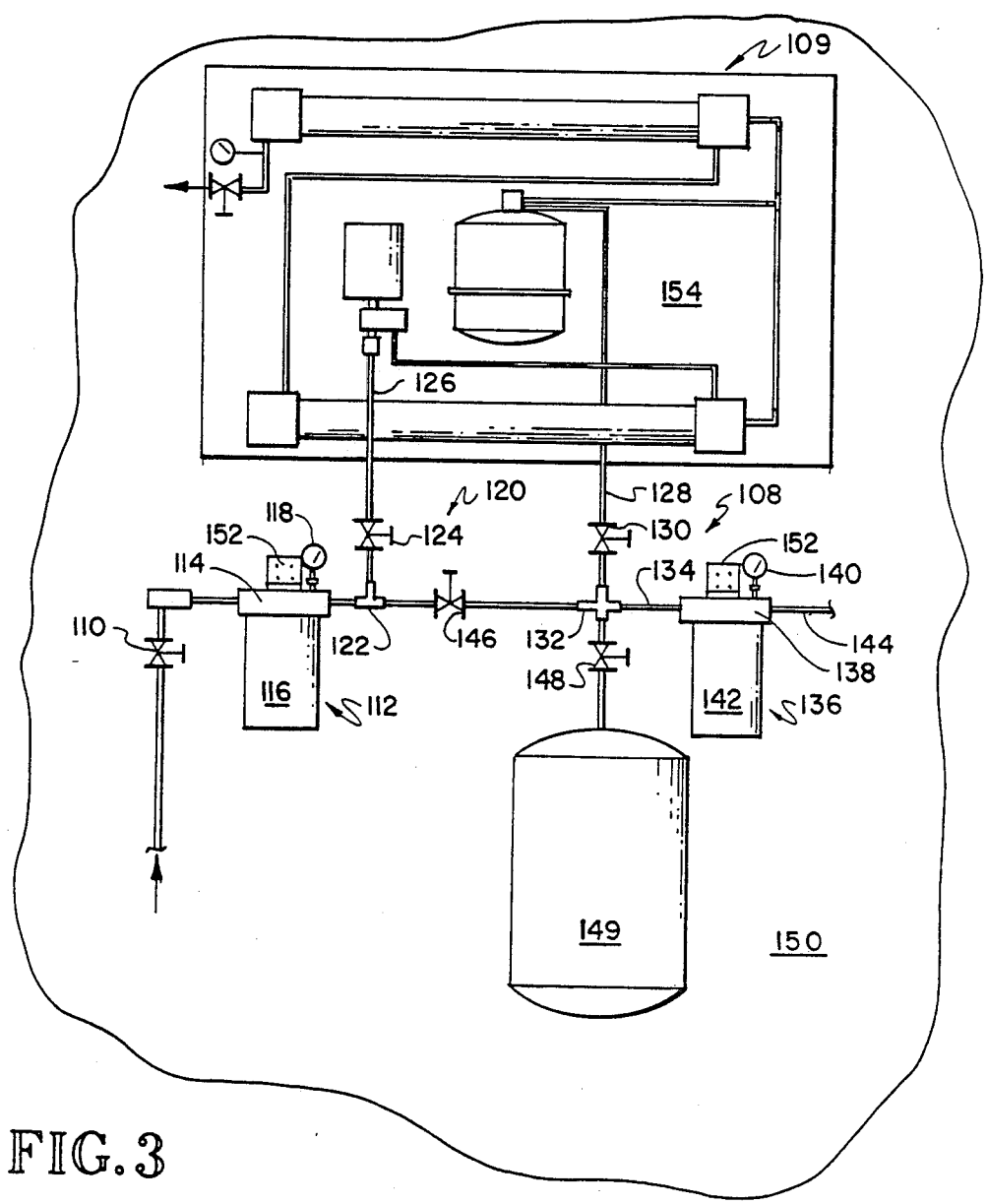
FIG. 3 is a partially schematic view of another embodiment of a reverse osmosis unit incorporating a filtering module used with the system of this invention.

Referring to FIG. 3, there is illustrated a filter arrangement 108 for use in conjunction with a reverse osmosis unit 109, which is substantially identical to the RO unit 30. The purpose of the filter arrangement 108 is to replace the prefilter 29 and the carbon filter arrangement 90 and provide for mechanical and adsorption filtering of the feed water in the event the RO unit 109 is out of commission because of failure or maintenance.

The filter arrangement 108 includes a normally open valved inlet 110 connected to a pre-filter 112 comprising a cap 114 and a removable container 116 having therein a replaceable filter cartridge (not shown) of any suitable type. A pressure gauge 118 is in communication with the discharge side of the container 116. When the pressure indicated by the gauge 118 falls to a predetermined value, e.g. 5 psi, the cartridge in the container 116 is replaced. The cap 114 is connected to a manifold 120 comprising a tee 122 having a normally open first valve 124 connected thereto and leading to a line or conduit 126 connected to the inlet of the RO unit 109. Permeate from the RO unit 109 exits through a line 128 into a second normally open valve 130 attached to a four way connector 132. Normal permeate flow is through a line 134 leading to a carbon filter arrangement 136 comprising a cap 138 having a pressure gauge 140 on the discharge side of the cap 138 and a removable container 142 having activated charcoal (not shown) therein. When the pressure indicated by the gauge 140 drops to a predetermined value, the charcoal media in the container 142 is replaced. The outlet 144 of the filter arrangement 136 is connected to the water distribution line leading to the carbonator, ice machine, ingredient tap and post-mix dispenser.

The manifold also includes a bypass valve 146 connecting the tee 122 and the four way connector 132. A normally open valve 148 connects to an additional storage tank 149. Normally, the bypass valve 146 is closed with the valves 124, 130 being open to divert feed water through the RO unit 109. When it is necessary to repair or maintain the RO unit 109, the valves 124, 130, 148 are closed and the bypass valve 146 is opened. Thus, the feed water passes through the prefilter 112 and the carbon filter arrangement 136 to the post-mix dispenser, ice machine and the like while the RO unit 126 is being repaired. Thus, while the RO unit 109 is being repaired, clean filtered water is available.

The filter arrangement 108 is desirably attached to a vertical wall 150 by the use of brackets 152 on the filters 112, 136. The storage tank 149 may be floor mounted. The RO unit 109 desirably includes a planar support 154 which is releasably attached to the wall 150. When the RO unit 109 malfunctions and requires maintenance, it can be bypassed as previously mentioned. When the RO unit 109 requires extensive repair, it can be removed from the wall merely by disconnecting the lines 126, 128 and detaching the support 154 from the wall 150.

A number of reverse osmosis units in accordance with this invention have been installed and operated in restaurants and fast food operations. Substantial syrup savings are realized because excess syrup is not required to overcome the taste effects of city water on the resultant product. In addition, better tasting products result because post-mix carbonators are more likely to provide water which is carbonated to a greater extent.

One of the problems with post-mix dispensers is that presently available portable carbonators are not as efficient as the carbonation systems used in commercial bottling plants. This is, of course, understandable because it is not economic to provide low volume mixing units, like post-mix dispensers, with the same type equipment used in the high volume units of commercial bottling plants. The use of RO water in a post-mix dispenser at least partially overcomes this difficulty for the following reasons. Carbonating water does a number of things to soft drinks. First, it creates some carbonic acid which gives a distinctive bite to soft drinks. Second, excess carbon dioxide becomes dissolved in the soft drink. If substantial amounts of calcium carbonate or calcium sulphate is present in the water, it acts as a buffer to retard the generation of carbonic acid. Thus, a much larger quantity of carbon dioxide must be added to hard waters to generate a desired level of carbonic acid in the carbonated water. Thus, conventional portable carbonators are often ill-equipped to carbonate medium hard-to-hard city water. The problem, of course, is obviated by the use of RO water as the inlet to the carbonator and conventional portable carbonators are better able to provide adequate feed water to a post-mix dispenser.

In industry jargon, the term "brix" means the percent sugar in a soft drink and is a result of the ratio of syrup to water. A typical syrup is about 50% sugar. A typical post-mix soft drink is made by mixing one part syrup to five parts water which means that the brix of the soft drink is in the vicinity of ten. One ounce of syrup added to five ounces of water produces a six ounce soft drink.

The post mix soft drinks of a number of outlets of three convenience store chains have been tested to determine the brix of the soft drink products as shown in the following tables. The brix reading of each sample is determined by a refractometer, the normal industry device for this purpose.

TABLE I

Convenience Store Chain #1

| Product | Store #25247 | Store #18538 | Store #19189 | Store #18569 | Store #17816 |
|---|---|---|---|---|---|
| | Observed Brix | | | | |
| Coke | 16.4 | 14.8 | 10.5 | 11.2 | 13.6 |
| Dr Pepper | 13.4 | 12.0 | 13.0 | 12.8 | 12.6 |
| Mtn. Dew | 14.0 | 12.4 | 13.4 | 20.0 | 17.0 |
| Pepsi | 13.0 | 11.6 | 13.8 | 15.0 | 11.4 |

| Product | average | weight | weighted average |
|---|---|---|---|
| | Analysis of observed Brix | | |
| Coke | 13.3 | 30% | 3.990 |
| Dr Pepper | 12.76 | 20% | 2.552 |
| Mtn. Dew | 15.36 | 20% | 3.072 |
| Pepsi | 12.96 | 30% | 3.888 |
| | | 100% | 13.502 |

TABLE I-continued

Convenience Store Chain #1

| | Standard Brix | | |
|---|---|---|---|
| Coke | 10.5 | 30% | 3.150 |
| Dr Pepper | 10.5 | 20% | 2.100 |
| Mtn. Dew | 13.0 | 20% | 2.600 |
| Pepsi | 11.0 | 30% | 3.300 |
| | | 100% | 11.150 |

| | Estimated Percent Syrup Savings |
|---|---|
| Weighted average Brix | 13.50 |
| Weighted standard Brix | 11.15 |
| Savings | 2.35 |
| Savings | 2.35 equals 17.4%. |
| Actual | 13.50 |

Several explanations are in order. The standard Brix averages were obtained by obtaining canned or bottled drinks of the commercial bottler and measuring the Brix in each of the samples. The idea is that if the local commercial bottler is mixing and selling soft drinks with a Brix of 10.5, why should the operator of a post-mix dispenser use more syrup than the bottler? The reason in the past has been that the drinks don't taste as well. By using RO water, in accordance with this invention, post-mix soft drinks taste as good as those commercially bottled with the same syrup ratios.

The actual amount of savings depends, of course, on the volume of soft drinks sold in a particular installation, the reduction in syrup consumption and the cost of the syrup. The following tabulation is exemplary:

TABLE IA

| | Estimated Dollar Savings | | | | |
|---|---|---|---|---|---|
| Containers sold/week | 5 | 6 | 7 | 8 | 9 |
| Cost per container | | | $25.00 each | | |
| Total cost/week | $125. | $150. | $175. | $200. | $225. |
| Estimated % savings | | | 17.4% | | |
| Total savings/week | $21.75 | $26.10 | $30.45 | $39.15 | $39.15 |
| Total savings/mo | 94.25 | 113.10 | 131.95 | 150.80 | 169.95 |

TABLE II

Convenience Store Chain #2

| | Observed Brix | | | | |
|---|---|---|---|---|---|
| Product | Store #261 | Store #388 | Store #658 | Store #831 | Store #265 |
| Sunkist | — | — | — | 18.8 | — |
| Dr Pepper | 15.5 | 13.6 | 14.8 | 15.2 | 19.0 |
| Cherry Coke | 14.8 | 19.4 | 14.4 | 15.8 | — |
| Sprite | 14.6 | 13.4 | 17.2 | 19.0 | 20.0 |
| Coke | 14.8 | 17.0 | 15.2 | 14.5 | 17.4 |
| Fanta Orange | 16.0 | 18.2 | — | — | 15.0 |
| Fanta S'berry | — | — | 15.8 | — | 19.0 |

| | Analysis of Observed Brix | | | |
|---|---|---|---|---|
| Product | Sample size | Average Brix | Standard Brix | Brix Savings | % Brix Savings |
| Sunkist | 1 | 18.80 | 12.0* | 6.80 | 36.2 |
| Dr Pepper | 5 | 15.62 | 10.5 | 5.12 | 32.8 |
| Cherry Coke | 4 | 16.00 | 11.5 | 4.50 | 28.1 |
| Sprite | 5 | 16.84 | 10.5 | 6.34 | 37.6 |
| Coke | 5 | 15.78 | 10.5 | 5.28 | 33.4 |
| Fanta Orange | 3 | 17.40 | 12.0* | 4.40 | 26.8 |
| Fanta S'berry | 2 | 17.40 | 12.0* | 5.40 | 31.0 |

*Standard Brix values are estimates - commercially bottled or canned samples were not available.
Without having sales values for each of the brands, a precise value for syrup savings is not calculable. It will be evident, of course, that the minimum savings will be 26.8% because this is the lowest savings value. In all likelihood, the savings in these stores would be on the order of 32%, or about double that shown in Tables I and IA.

TABLE III

Convenience Store Chain #3

| Product | Store #23 | Store #123 | Store #5 | Store #3 | Store #59 |
|---|---|---|---|---|---|
| *Observed Brix* | | | | | |
| Coke | 13.8 | 11.2 | 14.8 | 11.2 | 16.0 |
| Sprite | 18.4 | 13.6 | 14.2 | 16.2 | 11.2 |
| Cherry Coke | 18.2 | 12.8 | 14.6 | 13.0 | 18.0 |
| Dr Pepper | 11.2 | 11.2 | 16.4 | 15.0 | 11.8 |

| Product | Average | Weight | Weighted Average |
|---|---|---|---|
| *Analysis of Observed Brix* | | | |
| Coke | 13.4 | 50% | 6.700 |
| Sprite | 14.72 | 12.5% | 1.840 |
| Cherry Coke | 15.32 | 12.5% | 1.915 |
| Dr Pepper | 13.12 | 25% | 3.280 |
| | | 100% | 13.735 |
| *Standard Brix* | | | |
| Coke | 10.5 | 50% | 5.2500 |
| Sprite | 10.5 | 12.5% | 1.3125 |
| Cherry Coke | 11.5 | 12.5% | 1.4375 |
| Dr Pepper | 11.5 | 25% | 2.8750 |
| | | 100% | 10.875 |

Estimated Percent Savings

| | |
|---|---|
| Weighted Average Brix | 13.735 |
| Less: Standard Brix | −10.875 |
| Brix Savings | 2.86 |
| Brix savings | 2.86 equals 20.8% |
| Actual Brix | 13.735 |

Estimated Dollar Savings

| Containers sold/week | 5 | 6 | 7 | 8 | 9 |
|---|---|---|---|---|---|
| Cost per container | | | $25.00 | | |
| Total cost/week | $125. | $150 | $175. | $200. | $225. |
| Estimated % Savings | | | 20.8% | | |
| Savings/week | $26.00 | $31.20 | $36.40 | $41.60 | $46.80 |
| Savings/month | 112.66 | 135.20 | 157.73 | 180.27 | 202.80 |

A study of this information shows that the concentration of syrup in post-mix soft drinks varies substantially, suggesting that such soft drinks differ substantially in taste and suggesting that significant savings can be realized by properly monitoring the operation of post-mix dispensers.

Although the invention has been described in its preferred forms with a certain degree of particularity, it is understood that the present disclosure of the preferred forms is only by way of example and that numerous changes in the details of operation and in the combination and arrangement of parts may be resorted to without departing from the spirit and scope of the invention as hereinafter claimed.

I claim:

1. In combination,
   a carbonator having a feed water inlet and a carbonated water outlet;
   a post-mix soft drink dispenser having an inlet in communication with the carbonated water outlet, means for connection to a syrup container, a product outlet valve, and means responsive to manipulation of the outlet valve for delivering a predetermined proportion of carbonated water from the carbonator and syrup from the container to the outlet valve; and
   a reverse osmosis unit having a feed water inlet, a semipermeable membrane open to the unit inlet, a unit outlet in permeate receiving relation with the membrane and a drain in concentrate receiving relation with the membrane, the unit outlet being in communication with the carbonator feed water inlet.

2. The combination of claim 1 further comprising an ingredient water spigot in communication with the unit outlet upstream of the carbonator.

3. The combination of claim 2 further comprising an ice maker having a feed water inlet in communication with the unit outlet upstream of the carbonator.

4. The combination of claim 3 wherein the post-mix dispenser includes means for connection to a multiplicity of syrup containers, a multiplicity of the outlet valves, and the means responsive to manipulation of the outlet valve includes means responsive to manipulation of a first outlet valve for mixing carbonated water with syrup from a selected one of the containers.

5. In combination,
   a carbonator having a feed water inlet and a carbonated water outlet;
   a post-mix soft drink dispenser having an inlet in communication with the carbonated water outlet, means for connection to a syrup container, a product outlet valve, and means responsive to manipulation of the outlet valve for delivering a predetermined proportion of carbonated water from the carbonator and syrup from the container to the outlet valve;
   a reverse osmosis unit having a feed water inlet, a semipermeable membrane open to the unit inlet, a unit outlet in permeate receiving relation with the membrane and a drain in concentrate receiving relation with the membrane, the unit outlet being in communication with the carbonator feed water inlet; and
   a filter assembly including
      an inlet connection comprising the unit inlet;
      a pre-filter arrangement including a housing in communication with the unit inlet having a cartridge therein for removing suspended particulates above a predetermined size, a pressure gauge in communication with the housing and an outlet;
      a post-filter arrangement including a housing having an inlet and an activated carbon media therein for adsorbing dissolved gases from the permeate, a pressure gauge in communication with the housing and an outlet comprising the unit outlet; and
      a manifold between the pre-filter arrangement, the post-filter arrangement, and the reverse osmosis unit including
         a bypass conduit connecting the pre-filter housing and the post-filter housing and having a normally closed valve therein;
         a first conduit communicating with the bypass conduit between the normally closed valve and the pre-filter housing, the first conduit having a normally open valve therein and being connected to the reverse osmosis unit for delivering feed water thereto;
         a second conduit communicating with the bypass conduit between the normally closed valve and the post-filter housing, the second conduit having a normally open valve therein and being connected to the reverse osmosis unit for delivering permeate therefrom;
         a permeate storage tank; and
         a third conduit communicating with the bypass conduit between the normally closed valve and the post-filter housing, the third conduit having a normally open valve therein and being connected to the storage tank for delivering permeate therein.

6. The combination of claim 5 comprising means mounting the filter arrangement on a vertical wall, the reverse osmosis unit comprises a unit-handled assembly including a planar support releasably mounted on the vertical wall adjacent the filter arrangement.

7. A method of producing carbonated soft drinks comprising the steps of
  conducting a reverse osmosis water treatment on inlet feed water to produce a dissolved solids rich concentrate and a dissolved solids poor permeate;
  discarding the concentrate;
  delivering the permeate to a carbonator and mixing carbon dioxide with the permeate therein;
  delivering the carbonated permeate to a post-mix dispenser and mixing a quantity of the carbonated permeate with a predetermined quantity of soft drink syrup; and
  delivering the mixture of carbonated permeate and syrup from the post-mix dispenser.

8. The method of claim 7 further comprising the step of storing a quantity of uncarbonated permeate in a storage tank, removing uncarbonated permeate from the storage tank and delivering the uncarbonated permeate through an active adsorption media and adsorbing dissolved gases from the permeate onto the adsorption media and then carbonating the permeate.

9. A method of producing carbonated soft drinks comprising the steps of
  conducting a reverse osmosis water treatment on inlet feed water to produce a dissolved solids rich concentrate and a dissolved solids poor permeate;
  discarding the concentrate;
  delivering the permeate to a carbonator and mixing carbon dioxide with the permeate therein;
  delivering the carbonated permeate to a post-mix dispenser and mixing a quantity of the carbonated permeate with a quantity of soft drink syrup;
  delivering the mixture of carbonated permeate and syrup from the post-mix dispenser; and
  delivering a quantity of uncarbonated permeate into a bread dough and baking the bread dough.

* * * * *